United States Patent
Suzuki (10) Patent No.: US 9,103,426 B2
(45) Date of Patent: Aug. 11, 2015

(54) LEFT-RIGHT WHEEL DRIVE FORCE DISTRIBUTION CONTROL APPARATUS FOR A VEHICLE

(75) Inventor: Shinichi Suzuki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 126 days.

(21) Appl. No.: 13/806,614

(22) PCT Filed: Jul. 5, 2011

(86) PCT No.: PCT/JP2011/065391
§ 371 (c)(1),
(2), (4) Date: Dec. 21, 2012

(87) PCT Pub. No.: WO2012/005257
PCT Pub. Date: Jan. 12, 2012

(65) Prior Publication Data
US 2013/0110366 A1    May 2, 2013

(30) Foreign Application Priority Data
Jul. 9, 2010   (JP) ................. 2010-156659

(51) Int. Cl.
*F16H 48/30*   (2012.01)
*F16H 48/19*   (2012.01)
(Continued)

(52) U.S. Cl.
CPC .............. *F16H 48/30* (2013.01); *B60K 17/344* (2013.01); *B60K 23/04* (2013.01); *B60W 30/045* (2013.01);
(Continued)

(58) Field of Classification Search
CPC ..... B60W 10/12; B60W 10/14; B60W 10/16; B60W 2720/30; B60W 30/045; B60W 2201/14; B60W 8/1755; B60W 2720/28; B60W 2720/403; B60W 2720/406; B60T 2201/14; B60T 8/1755; F16H 48/30; F16H 48/19; F16H 2048/205; B60K 17/344; B60K 23/04; B60K 2023/043
USPC .......................................... 701/69
See application file for complete search history.

(56) References Cited

U.S. PATENT DOCUMENTS
6,064,930 A    5/2000   Shibahata
7,315,772 B2   1/2008   Tsutsumi et al.
8,271,177 B2   9/2012   Okamoto FOREIGN PATENT DOCUMENTS
CN    1522915 A    8/2004
CN    101595007 A   12/2009
(Continued)

OTHER PUBLICATIONS
Sawase, JP07-108841, Apr. 25, 1995 (machine translation).*
Shibahata, JP10-138785, May 26, 1998 (machine translation).*
Extended European Search Report for the corresponding European patent application No. 11803591.4 issued on Jun. 18, 2014.
(Continued)

*Primary Examiner* — Calvin Cheung
*Assistant Examiner* — Courtney Heinle
(74) *Attorney, Agent, or Firm* — Global IP Counselors, LLP (57) ABSTRACT

A left-right drive force difference transient control computation value calculating section uses a map search, based on a change rate of a target yaw rate, to find a left-right rear wheel drive force difference transient control computation value, which is a basic target value for a turning response transiently requested by a driver. A left-right drive force difference transient control gain computing section sets a left-right drive force difference transient control gain to be smaller than 1 in a low vehicle speed region. A transient control computing section multiplies the left-right rear wheel drive force difference transient control computing value by the left-right drive force difference transient control gain to calculate a left-right rear wheel drive force difference transient control amount and contributes the same to a left-right wheel drive force distribution control.

6 Claims, 5 Drawing Sheets

(51) Int. Cl.
*B60K 17/344* (2006.01)
*B60K 23/04* (2006.01)
*B60W 30/045* (2012.01)
*B60W 10/16* (2012.01)
*F16H 48/20* (2012.01)

(52) U.S. Cl.
CPC .......... *F16H 48/19* (2013.01); *B60K 2023/043* (2013.01); *B60W 10/16* (2013.01); *B60W 2720/28* (2013.01); *B60W 2720/403* (2013.01); *B60W 2720/406* (2013.01); *F16H 2048/205* (2013.01)

(56) References Cited

FOREIGN PATENT DOCUMENTS

| | | |
|---|---|---|
| JP | 10-138785 A | 5/1998 |
| JP | 2000-203300 A | 7/2000 |
| JP | 3116685 B2 | 12/2000 |

OTHER PUBLICATIONS

The Chinese Office Action for the corresponding Chinese Application No. 201180033428.0 issued on Dec. 23, 2014.

* cited by examiner

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065391, filed Jul. 5, 2011, which claims priority claims priority under to Japanese Patent Application No. 2010-156659, filed in Japan on Jul. 9, 2010, the entire contents of which is hereby incorporated by reference.

BACKGROUND

1. Field of the Invention

The present invention generally relates to a proposal for improving a left-right wheel drive force distribution control apparatus that is useful for a vehicle, particularly a four-wheel drive vehicle.

2. Background Information

Japanese Patent Publication No. 3,116,685 presents an example of a conventional left-right wheel drive force distribution control apparatus for a vehicle. The proposed technology relates to a transient control of a left-right wheel drive force distribution that accomplishes a target behavior change (typically a change of a targeted yaw rate) corresponding to a change of a vehicle operating state. The left-right wheel drive force distribution is controlled according to a steering speed imposed by a driver such that the difference between the drive forces of the left and right wheels is larger when the steering speed is high. As a result, a transient response can be improved during high-speed steering.

SUMMARY

However, a vehicle behavior (yaw rate) targeted for control by the transient response control is not determined solely based on the steering speed but also based on the vehicle speed. Consequently, if the transient control of the left-right wheel drive force distribution is executed in the conventional manner based on only the steering speed, then it will not be possible to achieve a different target yaw rate change based on the steering speed and the vehicle speed.

The present invention was conceived in view of this circumstance and its object is to provide a vehicle left-right wheel drive force distribution control apparatus that avoids the previously explained problem by executing a transient control of a left-right wheel drive force distribution based on a transient turning response request of a driver.

In order to achieve the aforementioned object, a vehicle left-right wheel drive force distribution control apparatus according to the present invention is a vehicle left-right wheel drive force distribution control apparatus that executes a distributed output of a wheel drive force to left and right drive wheels in accordance with a control. The left-right wheel drive force distribution control apparatus is provided with a left-right drive force transient control amount computing means that computes a left-right drive force difference transient control amount based on a transient turn response request of a driver. A left-right drive force difference transient control amount computed by said means is used in the drive force distribution control executed with respect to the left and right drive wheels.

The left-right drive force distribution control apparatus according to the present invention does not execute the transient control of the left-right wheel drive force distribution based solely on the steering speed. Instead, it executes the transient control of the left-right drive force distribution based on a transient turning response request of the vehicle that is determined based on the steering speed and other driving operations. Consequently, regardless of the steering sped and the vehicle speed, the transient turning response request of the vehicle can always be satisfied and the previously explained problem of the conventional device can be solved.

BRIEF DESCRIPTION OF THE DRAWINGS

Referring now to the attached drawings which form a part of this original disclosure.

DETAILED DESCRIPTION OF THE EMBODIMENTS

Embodiments of the present invention are described in detail below with reference to the embodiments in the drawings.

Figure 1:
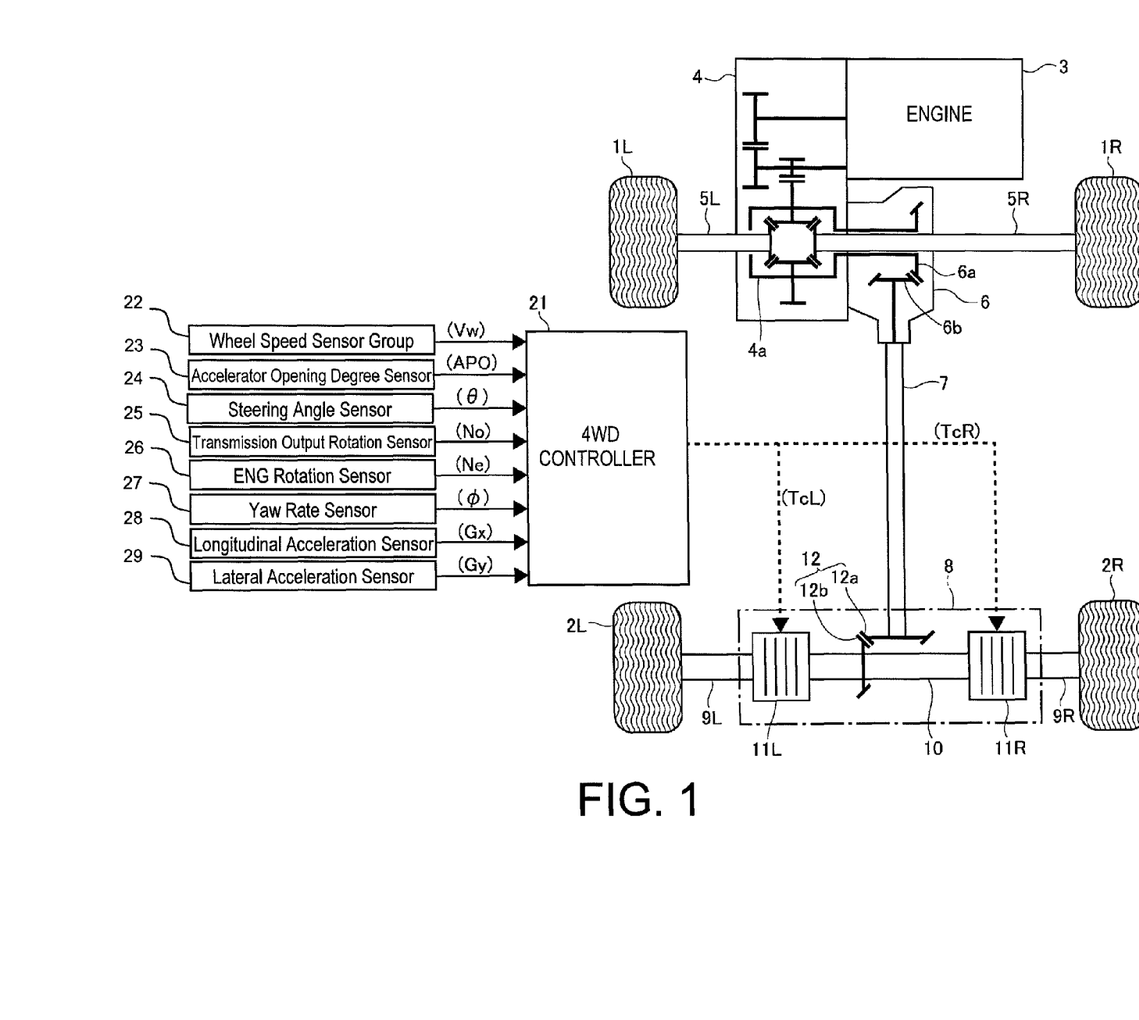
FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown.

FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" does not refer to power but, instead, refers to a torque value.

The reference numeral 3 indicates an engine serving as a prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6*a* is coupled to a differential gear case serving as an input rotary member of the differential gear device 4*a* such that the input hypoid gear rotates together with the differential gear case. The output hypoid gear 6*b* is coupled to a front end of the propeller shaft 7, and the propeller shaft 7 is arranged to extend rearward toward a left-right rear wheel drive force distributing unit 8.

The transfer case 6 sets a gear ratio of the bevel gear set comprising the hypoid gear 6*a* and the output hypoid gear 6*b* such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 provides a drive connection between the center shaft 10 and a rearward end of the propeller shaft 7 extending rearward from the transfer case 6. The final reduction gear 12 comprises an input hypoid gear 12*a* and an output hypoid gear 12*b*.

The reduction gear ratio of the final reduction gear 12 is set in relation to the speed-increasing gear ratio of the transfer case 6 (speed increasing gear ratio resulting from the bevel gear set comprising the hypoid gear 6*a* and the output hypoid gear 6*b*) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11R slip in accordance with the amount of the rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively, which are calculated as will be explained later.

In order to compute a target drive force TcL of the left wheel 2L and a target drive force TcR of the right wheel, the four-wheel drive controller 21 receives the following input signals: a signal from a wheel speed sensor group 22 that a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle $\theta$; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate $\phi$ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the drive forces of the left and right rear wheels 2L and 2R match the target drive forces TcL and TcR.

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
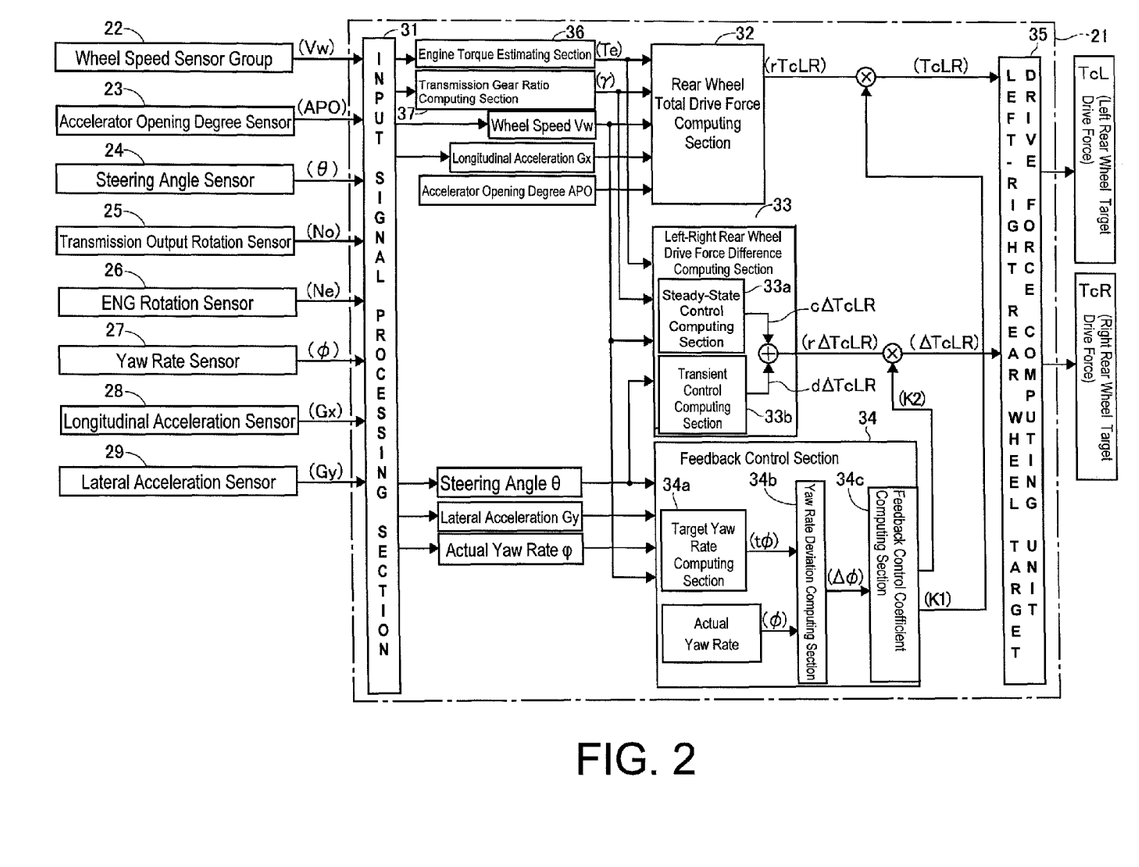
FIG. 2 is a function-specific block diagram of the four-wheel drive controller shown in FIG. 1.

As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio $\gamma$.

An example of how the rear wheel total drive force computing section 32 computes a total drive force target value rTcLR (hereinafter called "total drive force rTcLR) for the left and right rear wheels 2L and 2R will now be explained. First, the drive force computing section 32 computes an input torque Ti to the differential gear device 4a based on the engine torque Te and the transmission gear ratio $\gamma$. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R estimated by comparing the two average speeds. The computing section 32 also determines how much of the input torque Ti to direct toward the left and right rear wheels 2L and 2R in accordance with the degree of drive slippage, the longitudinal acceleration, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by the driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value rΔTcLR (hereinafter called drive force difference rΔTcLR) between the left and right rear wheels 2L and 2R as, for example, will now be explained.

The steady-state control computing section 33a calculates a left-right rear wheel drive force difference steady-state control amount cΔTcLR for achieving a vehicle turning behavior requested by a driver in a steady manner as will now be explained. The steady-state control computing section 33a estimates a longitudinal acceleration rate Gx of the vehicle based on the engine torque Te and the transmission gear ratio $\gamma$ and a lateral acceleration rate Gy of the vehicle based on a steering angle $\theta$ and a vehicle speed VSP. An under-steering state (state in which an actual turning behavior is insufficient in relation to a target turning behavior) can be ascertained based on a combination of the estimated longitudinal acceleration rate Gx and the lateral acceleration rate Gy. The steady-state control computing section 33a determines a left-right rear wheel drive force difference necessary to resolve the under-steering state as a left-right rear wheel drive force steady-state control amount cΔTcLR. The reason estimated values of the longitudinal acceleration rate Gx and the lateral acceleration rate Gy are used instead of detected values is that the steady-state control computing section 33a is a feed forward control system and an estimated value matches the actual state of the control better than a detected value, which is a result value.

Thus, while the steering angle $\theta$ is near 0 (while the wheels are not being turned), the left-right rear wheel drive force difference steady-state control amount cΔTcLR is held at 0 because the lateral acceleration rate Gy equals 0. Conversely, while the steering angle $\theta$ is not near 0 (while the wheels are being turned), the lateral acceleration rate Gy increases as the steering angle $\theta$ and the vehicle speed VSP increase and there is a strong tendency for the vehicle to experience under-steering. Consequently, the left-right rear wheel drive force difference steady-state control amount cΔTcLR increases. Furthermore, as the longitudinal acceleration rate Gx increases, the tendency for the vehicle to experience under-steering strengthens and the left-right rear wheel drive force difference steady-state control amount cΔTcLR increases.

Figure 3:
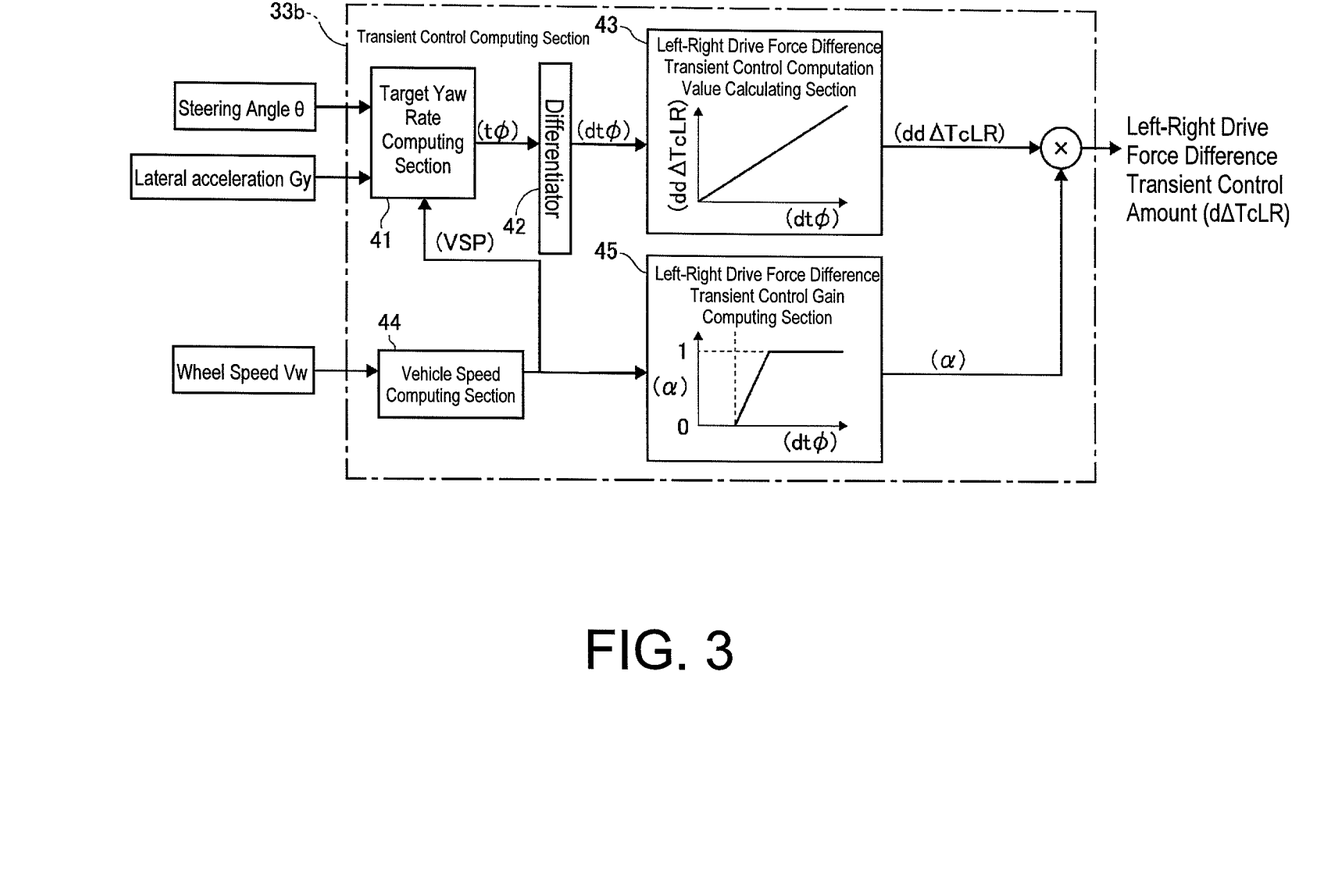
FIG. 3 is a function-specific block diagram of the transient control computing section shown in FIG. 2.

The transient control computing section 33b calculates a left-right rear wheel drive force difference transient control amount dΔTcLR for achieving a turning response transiently requested by a driver through the change rate of the steering angle $\theta$ while traveling at the current vehicle speed VSP. As shown in FIG. 3, the transient control computing section 33b comprises a target yaw rate computing section 41, a differentiator 42, a left-right drive force difference transient control computation value calculating section 43, a vehicle speed computing section 44, and a left-right drive force difference transient control gain computing section 45.

The target yaw rate computing section 41 computes a target yaw rate t$\phi$ desired by the driver based on the steering angle $\theta$ and a vehicle speed VSP calculated by the vehicle speed computing section 44 based on the wheel speeds Vw. The target yaw rate computing section 41 limits the target yaw rate t$\phi$ based on the lateral acceleration Gy. The differentiator 42 differentiates the target yaw rate t$\phi$ to calculate a change rate dt$\phi$ of the target yaw rate (a turning response transiently requested by the driver through a driving operation). Thus, the target yaw rate computing section 41 and the differentiator 42 constitute a target yaw rate change rate computing means according to the present invention.

Based on the change rate dt$\phi$ of the target yaw rate t$\phi$, the left-right drive force difference transient control computation value calculating section 43 executes a map search to find a left-right rear wheel drive force difference transient control computation value ddΔTcLR to be a basic target value for achieving the turning response transiently requested by the driver. Thus, the left-right drive force difference transient control computation value calculating section 43 constitutes a left-right drive force difference transient control amount computing means according to the present invention. The left-right rear wheel drive force difference transient control computation value ddΔTcLR is set to be larger when the change rate dtφ of the target yaw rate tφ is higher because a higher turning response is desired when the change rate dtφ is higher. The reason a change rate dtφ of the target yaw rate tφ is used instead of a change rate of a yaw rate detection value φ is that the transient control computing section 33*b* is a feed forward control system and the target yaw rate tφ (which is an estimated value) matches the actual state of the control better than a detected value φ (which is a result value).

The left-right drive force difference transient control gain computing section 45 serves to set a left-right drive force difference transient control gain α. The left-right drive force difference transient control gain α is multiplied by the aforementioned left-right rear wheel drive force difference transient control computation value ddΔTcLR to calculate a left-right rear wheel drive force difference transient control amount dΔTcLR. Thus, the left-right drive force difference transient control gain computing section 45 and the left-right drive force difference transient control computation value calculating section 43 together constitute a left-right drive force difference transient control amount computing means according to the present invention. The left-right drive force difference transient control gain computing section 45 searches the map shown in FIG. 4 or 5 to find the left-right drive force difference transient control gain α based on the vehicle speed VSP.

Figure 4:
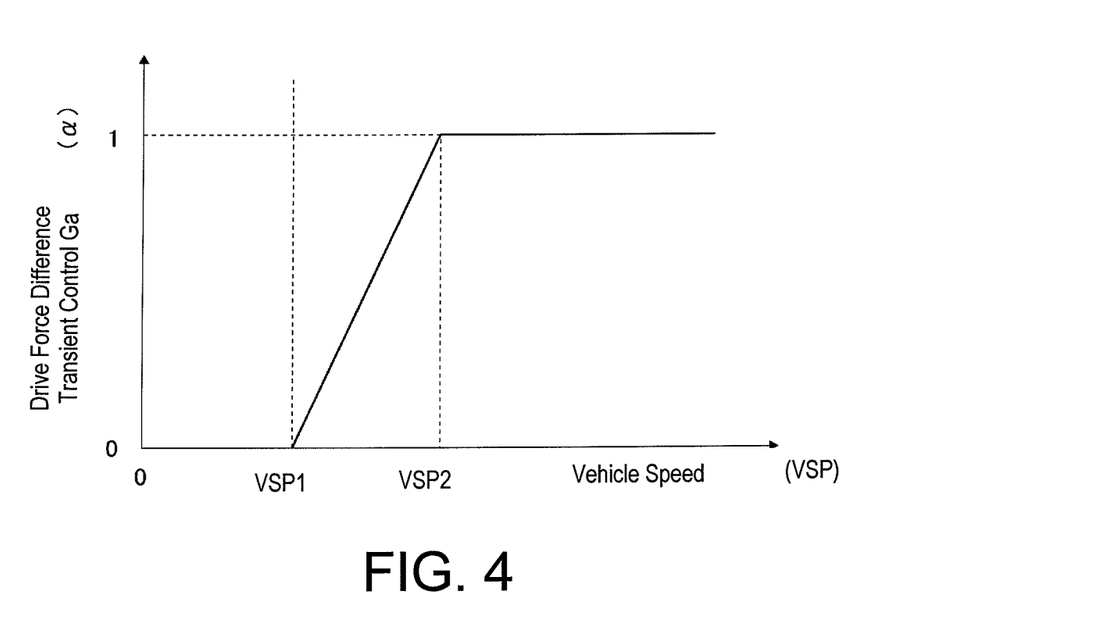
FIG. 4 is a characteristic curve diagram showing an example of a change characteristic of a left-right drive force difference transient control gain used by the transient control computing section shown in FIG. 2.
Figure 5:
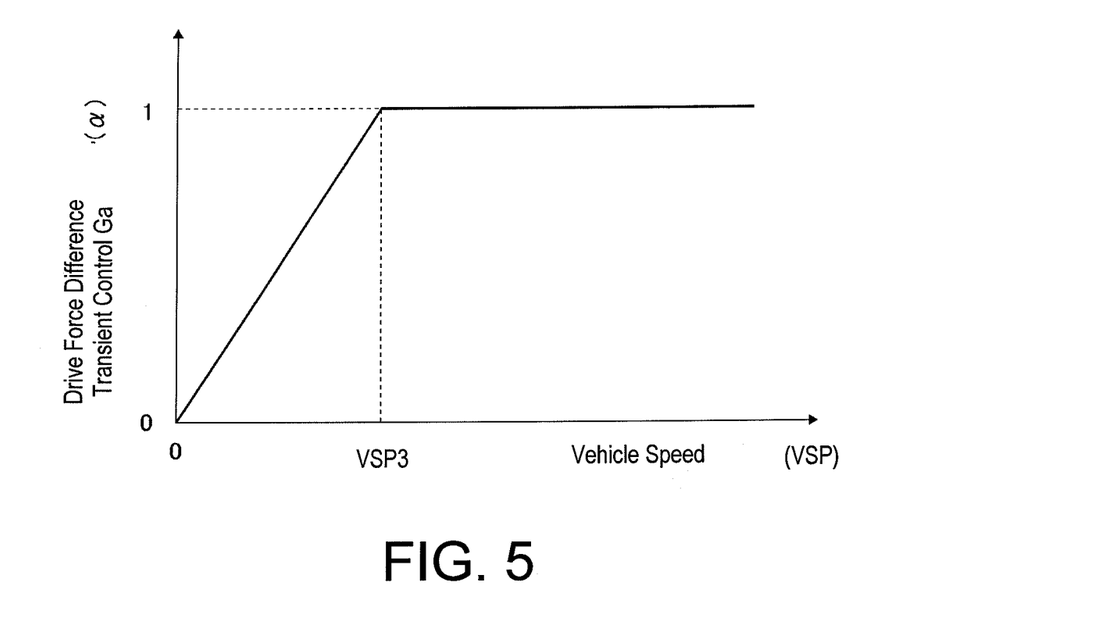
FIG. 5 is a characteristic curve diagram showing another example of a change characteristic of a left-right drive force difference transient control gain used by the transient control computing section shown in FIG. 2.

As shown in FIG. 4 and FIG. 5, the left-right drive force difference transient control gain α is a positive value within a range spanning from 0 to 1 that varies according to the vehicle speed VSP and, in both cases, has α value smaller than 1 when the vehicle speed is in a low speed region. In the case shown in FIG. 4, the left-right drive force difference transient control gain α has a value of 0 at very low vehicle speeds in the region VSP<VSP1 and a value of 1 at medium to high vehicle speeds in the region VSP≥VSP2). At low vehicle speeds in the region VSP1≤VSP≤VSP2, the value gradually decreases from 1 to 0 as the vehicle speed VSP decreases. In the case shown in FIG. 5, the left-right drive force difference transient control gain α decreases gradually from 1 to 0 as the vehicle speed VSP decreases at very low vehicle speeds and low vehicle speeds in the region 0≤VSP<VSP3 and has a value of 1 at medium to high vehicle speeds in the region VSP≥VSP3.

As shown in FIG. 3, the transient control computing section 33*b* multiplies the left-right drive force difference transient control gain α by the left-right rear wheel drive force difference transient control computation value ddΔTcLR to calculate the left-right rear wheel drive force difference transient control amount dΔTcLR. Thus, the left-right rear wheel drive force difference transient control amount dΔTcLR is equivalent to a value obtained by reducing the left-right rear wheel drive force difference transient control computation value ddΔTcLR (which is a basic target value for achieving the turning response transiently requested by the driver) according to the gain α.

In the cases shown in FIG. 4 and FIG. 5, since the left-right drive force difference transient control gain α has a value of 1 in a region of medium to high vehicle speeds and a positive value smaller than 1 in a region of low vehicle speeds, the left-right rear wheel drive force difference transient control amount dΔTcLR is the same as the left-right rear wheel drive force difference transient control computing value ddΔTcLR in the region of medium to high vehicle speeds and decreases in comparison with the medium to high vehicle speed region when the vehicle is in the low vehicle speed region.

Also, when the left-right drive force difference transient control gain α is set as shown in FIG. 4, the left-right rear wheel drive force difference transient control amount dΔTcLR has a value of 0 in the very low vehicle speed region VSP<VSP1, a value equal to the left-right rear wheel drive force difference transient control computation value ddΔTcLR in the medium to high vehicle speed region VSP≥VSP2, and gradually decreases from the value equal to the left-right rear wheel drive force difference transient control computation value ddΔTcLR to 0 in the low vehicle speed region VSP1≤VSP<VSP2.

Meanwhile, when the left-right drive force difference transient control gain α is set as shown in FIG. 5, the left-right rear wheel drive force difference control amount dΔTcLR decreases gradually from the value equal to the left-right rear wheel drive force difference transient control computation value ddΔTcLR to 0 as the vehicle speed VSP decreases in the very low and low vehicle speed region 0≤VSP<VSP3 and has the same value as the left-right rear wheel drive force difference transient control computation value ddΔTcLR in the medium to high vehicle speed region VSP≥VSP3.

The left-right rear wheel drive force difference computing section 33 calculates a sum value of the left-right rear wheel drive force difference steady-state control amount cΔTcLR calculated by the steady-state control computing section 33*a* as explained previously and the left-right rear wheel drive force difference transient control amount dΔTcLR calculated by the transient control computing section 33*b* as explained previously and sets the sum value as a left-right rear wheel drive force difference rΔTcLR to serve as a target during the vehicle turning behavior.

However, there are situations in which the actual turning behavior (actual yaw rate φ) actually exhibited by the vehicle in response to the left-right rear wheel drive force difference rΔTcLR is affected by a lateral wind or other external disturbance and does not match the target turning behavior (target yaw rate tφ) requested through the steering operation performed by the driver. When the actual yaw rate φ and the target yaw rate tφ do not match, the feedback control section 34 revises the rear wheel total drive force rTcLR and the rear wheel drive force difference rΔTcLR as explained below such that a final rear wheel total drive force TcLR and rear wheel drive force difference ΔTcLR are obtained.

The feedback control section 34 has a target yaw rate computing section 34*a*, a yaw rate deviation computing section 34*b*, and a feedback control coefficient computing section 34*c*. The target yaw rate computing section 34*a* computes a target yaw rate tφ desired by the driver based on the steering angle θ, the lateral acceleration Gy, and the vehicle speed VSP (which is calculated based on the wheel speeds Vw). The yaw rate deviation computing section 34*b* computes a yaw rate deviation Δφ (=φ−tφ) between the target yaw rate tφ and a detected actual yaw rate φ.

Based on the yaw rate deviation Δφ, the feedback control coefficient computing section 34*c* determines if the vehicle is in an over-steered state in which the actual yaw rate φ exceeds the target yaw rate tφ beyond a dead band, in an under-steered state in which the actual yaw rate φ is insufficient with respect to the target yaw rate tφ beyond a dead zone, or in a neutral steering state in which the actual yaw rate φ is within dead zones in front of and behind the target yaw rate tφ. Based on this determination result, the feedback control coefficient computing section 34*c* sets a feedback control coefficient K1

(0 or 1) for the rear wheel total drive force rTcLR and a feedback control coefficient K2 (0 or 1) for the rear wheel drive force difference rΔTcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference rΔTcLR to calculate a revised final rear wheel drive force difference ΔTcLR.

Regarding setting the feedback control coefficients K1 and K2, if the feedback control coefficient computing section 34c determines that the vehicle is in an over-steered state (Φ>tΦ+ dead band), then it sets the feedback control coefficient K1 for the rear wheel total drive force rTcLR to 0 and sets the feedback control coefficient K2 for the rear wheel drive force difference rΔTcLR to 0 in order to eliminate harmful effects caused by four-wheel drive travel. Setting the feedback control coefficient K1 to 0 causes the revised final rear wheel total drive force TcLR to be 0, and setting the feedback control coefficient K2 to 0 causes the revised final rear wheel drive force difference ΔTcLR to be 0. This means the vehicle travels in two-wheel drive and, as a result, the harmful effects that could result from traveling in four-wheel drive while in an over-steered state can be eliminated.

If the feedback control coefficient computing section 34c determines that the vehicle is in an under-steered state (Φ<tΦ−dead band), then, although there are no harmful effects caused by four-wheel drive travel, the feedback control coefficient computing section 34c sets the feedback control coefficient K1 for the rear wheel total drive force rTcLR to 1 and sets the feedback control coefficient K2 for the rear wheel drive force difference rΔTcLR to 0 in order to eliminate harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 0 causes the revised final rear wheel drive force difference ΔTcLR to be 0. This means that the vehicle is operated in four-wheel drive but a drive force difference is not set between the left and right rear wheels. As a result, excellent traction can be enjoyed by operating in four-wheel drive while in an under-steered state while eliminating the harmful effects of setting a drive force difference between the left and right rear wheels.

If the feedback control coefficient computing section 34c determines that the vehicle is in a neutral steering state (tΦ−dead band<Φ<tΦ+dead band), then the feedback control coefficient computing section 34c sets the feedback control coefficient K1 for the rear wheel total drive force rTcLR to 1 and sets the feedback control coefficient K2 for the rear wheel drive force difference rΔTcLR to 1 because there are no harmful effects caused by four-wheel drive travel and no harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 1 causes the revised final rear wheel drive force difference ΔTcLR to be set as ΔTcLR=rΔTcLR. This means that the vehicle is operated in four-wheel drive and a drive force difference is set between the left and right rear wheels.

Figure 6:
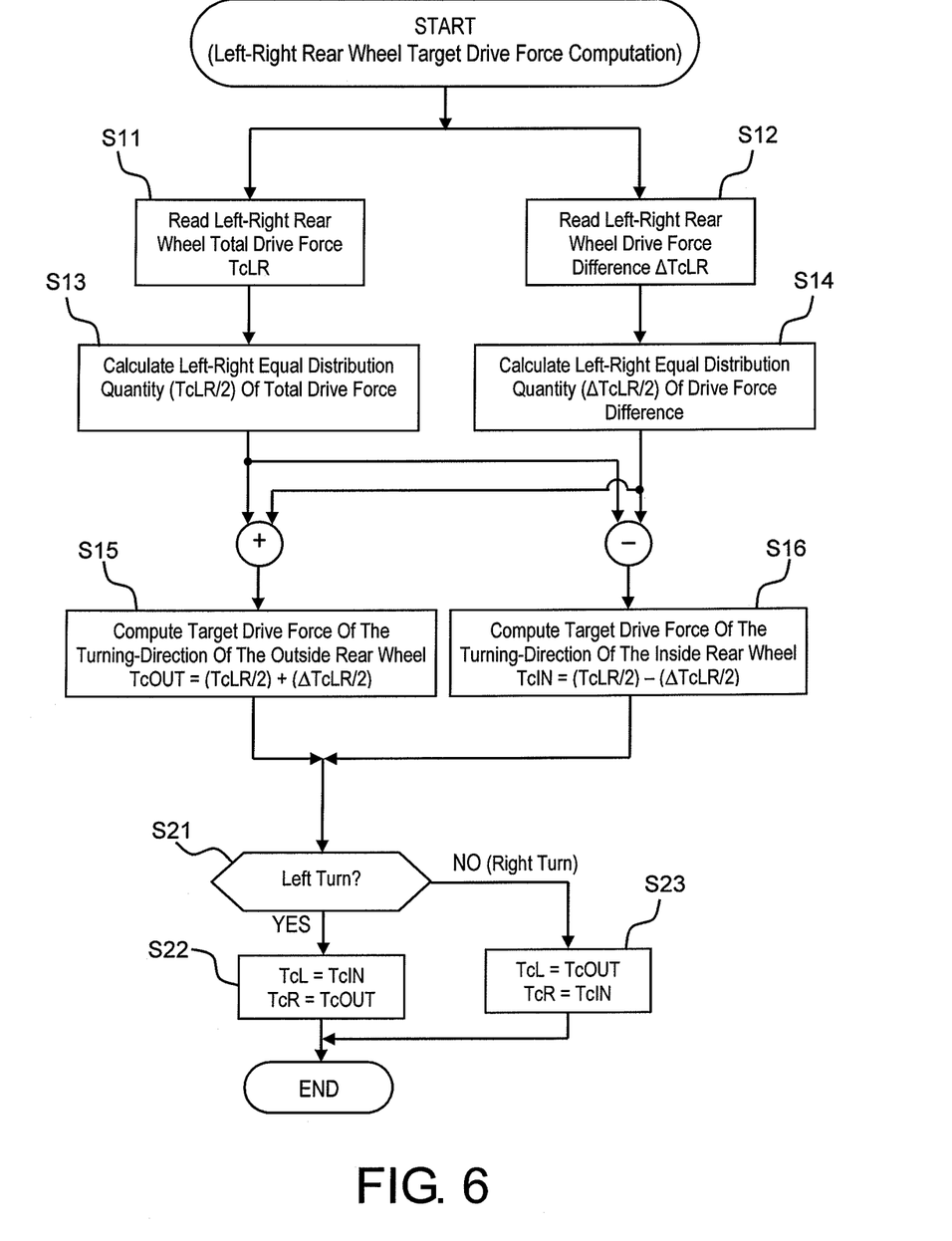
FIG. 6 is a flowchart showing a process by which the left-right rear wheel target drive force computing section shown in FIG. 2 computes left and right rear wheel target drive forces.

Based on the process shown in FIG. 6, the left-right rear wheel target drive force computing section 35 calculates a left rear wheel target drive force TcL and a right rear wheel target drive force TcR that satisfy both the left-right rear wheel total drive force TcLR and the left-right rear wheel drive force difference ΔTcLR, which are to be the revised final targets.

In step S11, the left-right rear wheel target drive force computing section 35 reads the final rear wheel total drive force TcLR revised by the previously explained feedback control, and in step S12 the left-right rear wheel target drive force computing section 35 reads the final left-right rear wheel drive force difference ΔTcLR revised by the feedback control.

In step S13, the left-right rear wheel target drive force computing section 35 calculates a left-right equal distribution quantity TcLR/2 of the rear wheel total drive force TcLR read in step S11, and in step S14, the left-right rear wheel target drive force computing section 35 calculates a left-right equal distribution quantity ΔTcLR/2 of the rear wheel drive force difference ΔTcLR read in step S12. In step S15, the left-right rear wheel target drive force computing section 35 adds the rear wheel drive force difference left-right equal distribution quantity ΔTcLR/2 to the rear wheel total drive force left-right equal distribution quantity TcLR/2 to calculate a target drive force TcOUT (=TcLR/2+ΔTcLR/2) of the turning-direction outside rear wheel. In step S16, the left-right rear wheel target drive force computing section 35 subtracts the rear wheel drive force difference left-right equal distribution quantity ΔTcLR/2 from the rear wheel total drive force left-right equal distribution quantity TcLR/2 to calculate a target drive force TcIN (=TcLR/2−ΔTcLR/2) of the turning-direction inside rear wheel.

Thus calculated, the target drive force TcOUT of the turning-direction outside rear wheel and the target drive force TcIN of the turning-direction inside rear wheel serve as a target drive force of the turning-direction outside rear wheel and a target drive force of the turning-direction inside rear wheel that achieve both the rear wheel total drive force TcLR and the rear wheel drive force difference ΔTcLR.

In step S21 and subsequent steps, the left-right rear wheel target drive force computing section 35 sets the left rear wheel target drive force TcL and the right rear wheel target drive force TcR based on the target drive force TcOUT of the turning-direction outside rear wheel and the target drive force TcIN of the turning-direction inside rear wheel as will now be explained. First, in step S21, the left-right rear wheel target drive force computing section 35 determines if the vehicle is undergoing a left turn or a right turn based on the steering angle θ and the yaw rate Φ.

If it is a left turn, then in step S22 the left-right rear wheel target drive force computing section 35 sets the inside wheel target drive force TcIN as the target drive force TcL of the left rear wheel (which is the turning-direction inside wheel) and sets the outside wheel target drive force TcOUT as the target drive force TcR of the right rear wheel (which is the turning-direction outside wheel). Conversely, if it is a right turn, then in step S23 the left-right rear wheel target drive force computing section 35 sets the outside wheel target drive force TcOUT as the target drive force TcL of the left rear wheel (which is the turning-direction outside wheel) and sets the inside wheel target drive force TcIN as the target drive force TcR of the right rear wheel (which is the turning-direction inside wheel).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR set by the computing section 35 shown in FIG. 2 as explained previously.

Effects that are obtained with a left-right wheel (left and right rear wheels) drive force distribution control for a four-wheel drive vehicle according to the embodiment explained heretofore will now be explained.

(1) The transient control computing section 33*b* is configured as explained previously with reference to FIG. 3. Based on the change rate dtΦ of the target yaw rate tφ, the left-right drive force difference transient control computation value calculating section 43 finds the left-right rear wheel drive force difference transient control computation value ddΔTcLR, which is a basic target value for achieving the turning response transiently requested by the driver in terms of steering speed at the current vehicle speed. The left-right drive force difference transient control gain computing section 45 finds the left-right drive force difference transient control gain α in accordance with the vehicle speed VSP, i.e., finds the left-right drive force difference transient control gain α such that it has a value smaller than 1 in a low vehicle speed region as exemplified in FIG. 4 or 5. The transient control computing section 33*b* then multiplies the left-right rear wheel drive force difference transient control computation value ddΔTcLR by the left-right drive force difference transient control gain α to calculate the left-right rear wheel drive force difference transient control amount dΔTcLR and contributes the same to the left-right wheel (left and right rear wheels) drive force distribution control.

As a result, with this embodiment, instead of executing the transient control of the left-right wheel drive force distribution based on only the steering speed as in the conventional device, the transient control of the left-right wheel drive force distribution is executed based on the change rate dtφ of the target yaw rate tφ, which is determined based on the steering speed and the vehicle speed, i.e., based on a change rate of a yaw rate that is subjected to the control. Thus, the target yaw rate change rate can always be achieved regardless of the steering speed and the vehicle speed.

(2) As explained previously in the embodiment, since the left-right rear wheel drive force difference transient control amount dΔTcLR is calculated by multiplying the left-right rear wheel drive force difference transient control computation value dd ΔTcLR (which is a basic target value) by the left-right drive force difference transient control gain α (which is smaller than 1 in a low vehicle speed region as shown in FIG. 4 or 5), the value of the left-right rear wheel drive force difference transient control amount dΔTcLR is smaller in a low vehicle speed region than in other vehicle speed regions. The effects obtained as a result will now be explained.

In the low vehicle speed region, a high turning response is not required. For example, when driving at a low speed while parking the vehicle in a garage, even if the steering wheel were operated at a high speed and a high turning response was delivered, the front end turning maneuverability would be too high and it would be difficult to align the vehicle with the desired direction. Consequently, the drivability would be degraded. With this embodiment, however, since the left-right rear wheel drive force difference transient control amount dΔTcLR is decreased in the low vehicle speed region, the turning response is decreased in the low vehicle speed region and the aforementioned degradation of the drivability can be avoided.

(3) Also, in the embodiment, the left-right drive force difference transient control gain α is set to become gradually smaller as the vehicle speed decreases in a low vehicle speed region as shown in FIG. 4 or FIG. 5. Consequently, the left-right rear wheel drive force difference transient control amount dΔTcLR becomes gradually smaller as the vehicle speed decreases in the low vehicle speed region and it is possible to avoid the odd feeling of a sudden change in the degree of turning response caused by the left-right rear wheel drive force difference transient control amount dΔTcLR changing suddenly in response to a vehicle speed change near a boundary of the low vehicle speed region.

(4) If the left-right drive force difference transient control gain α is set to be 0 in the very low vehicle speed region VSP<VSP1 as shown in FIG. 4, then the left-right rear wheel drive force difference transient control amount dΔTcLR is 0 at very low vehicle speeds and the aforementioned problem of the drivability degrading when the vehicle is parked in a garage can be more reliably solved.

In the examples shown in the drawings, the target yaw rate computing section 41 and the differentiator 42 of FIG. 3 calculate the change rate dtφ of the yaw rate tφ desired by the driver (turning response transiently requested by the driver through a driving operation) based on the steering angle θ and the vehicle speed VSP, and the left-right drive force difference transient control computation value calculating section 43 calculates the left-right rear wheel drive force difference transient control computation value ddΔTcLR (transient component of the left-right rear wheel drive force difference) for the turning response requested transiently by the driver based on the change rate dtφ of the target yaw rate tφ. However, so long as the left-right rear wheel drive force difference transient control computation value ddΔTcLR (transient component of the left-right rear wheel drive force difference) is a value corresponding to the transient response request caused by the driver (driving operation), then the same effects can be obtained and the computation value can be calculated based on factors other than the operating angle θ and the vehicle speed VSP and using a method other than the method explained above.

The invention claimed is:

1. A vehicle left-right wheel drive force distribution control apparatus comprising:
    a controller programmed to execute a distributed output of a wheel drive force to left and right drive wheels in accordance with a front-rear wheel drive force distribution control, the controller including
    a transient control computing section programmed to compute a left-right rear wheel drive force difference transient control amount in response to a driver requested transient turn response that is based on change rate of the steering angle and vehicle speed, the transient control computing section including a target yaw rate computing section that is programmed to
        compute a target yaw rate change rate by calculating a target yaw rate based on the steering angle and the vehicle speed,
        limit the target yaw rate based on lateral acceleration, and
        differentiate the target yaw rate to obtain a left-right rear wheel drive force difference transient control computation value to achieve the target yaw rate change rate, the target yaw rate change rate being the driver requested transient turn response,
    a steady-state control computing section programmed to compute a left-right rear wheel drive force difference steady-state control amount by calculating the lateral acceleration rate and a longitudinal acceleration rate of the vehicle,
    a left-right rear wheel drive force difference computing section programmed to compute the sum of the left-right rear wheel drive force difference steady-state control amount and the left-right rear wheel drive force difference transient control amount, the sum being used as the target vehicle turning amount.

2. The vehicle left-right wheel drive force distribution control apparatus according to claim 1, wherein
the transient control computing section is further programmed to decrease the left-right drive force difference transient control amount while a vehicle is in a low vehicle speed region.

3. The vehicle left-right wheel drive force distribution control apparatus according to claim 2, wherein
the transient control computing section is further programmed to gradually decrease the left-right drive force difference transient control amount as the vehicle speed decreases in the low vehicle speed region.

4. The vehicle left-right wheel drive force distribution control apparatus according to claim 2, wherein
the transient control computing section is further programmed to set the left-right drive force difference transient control amount to 0 at vehicle speeds that are below a set vehicle speed within the low vehicle speed region.

5. The vehicle left-right wheel drive force distribution control apparatus according to claim 3, wherein
the transient control computing section is further programmed to set the left-right drive force difference transient control amount to 0 at vehicle speeds that are below a set vehicle speed within the low vehicle speed region.

6. The vehicle left-right wheel drive force distribution control apparatus according to claim 1, wherein
the steady-state control computing section is programmed to calculate the longitudinal acceleration rate based on engine torque and transmission gear ratio.

\* \* \* \* \*